United States Patent [19]
Benton

[11] B 3,914,186
[45] Oct. 21, 1975

[54] SPONGE RUBBER RUG UNDERLAY HAVING IMPROVED HEAT AGE RESISTANCE

[75] Inventor: Richard E. Benton, Alliance, Ohio

[73] Assignee: The General Tire & Rubber Company, Akron, Ohio

[22] Filed: Apr. 16, 1973

[21] Appl. No.: 351,218

[44] Published under the Trial Voluntary Protest Program on January 28, 1975 as document no. B 351,218.

[52] U.S. Cl. ...... 260/2.5 HB; 117/161 UD; 161/67; 117/162; 260/2.5 H; 260/2.5 R; 260/42.32; 260/42.47; 260/45.7 P; 260/724; 260/799
[51] Int. Cl.² .......................................... C08J 9/00
[58] Field of Search ........ 260/2.5 H, 2.5 HB, 2.5 R, 260/299, 45.7 P, 2.5 L, DIG. 24, 724; 161/67

[56] References Cited
UNITED STATES PATENTS

| | | | |
|---|---|---|---|
| 3,095,398 | 6/1963 | Howland et al. | 260/2.5 L |
| 3,264,232 | 8/1966 | Lucke | 260/2.5 L |
| 3,542,700 | 11/1970 | Hilditch et al. | 260/2.5 L |
| 3,645,926 | 2/1972 | Dunlop | 260/2.5 L |
| 3,719,614 | 3/1973 | Wright | 260/2.5 L |
| 3,737,488 | 6/1973 | Porter et al. | 260/2.5 L |
| 3,741,854 | 6/1973 | De Goria | 260/2.5 L |

*Primary Examiner*—Morton Foelak

[57] ABSTRACT

A sponge rubber rug underlay compound which is capable of withstanding a temperature of about 275°F. for at least about 24 hours without appreciable degradation, or loss of resiliency. The compound comprises about 100 parts of a rubber which may be subject to oxidative degradation, between about 200 and about 250 parts of calcium carbonate, from about 0.5 to about 3.0 parts of an antioxidant and from about 1.5 to about 3.0 parts of an alkali metal phosphate.

3 Claims, No Drawings

SPONGE RUBBER RUG UNDERLAY HAVING IMPROVED HEAT AGE RESISTANCE

BACKGROUND OF THE DISCLOSURE

1. Field of the Invention

The present invention relates to a flexible polymeric sponge material, and more particularly, to a sponge rubber rug underlay compound having improved heat age resistance.

Rug underlay is frequently made from a filled rubber, either natural or synthetic, one of the most common of which is styrene-butadiene rubber (SBR). SBR, when combined properly with various fillers, antioxidants, cure accelerators and other trace ingredients, provides a durable, resilient and flexible rug underlay. Conventionally, the filler material has been soft clay plus calcium carbonate, although it is also known to use calcium cabonate alone. A typical calcium carbonate is the one known commercially as Whiting.

Among the properties for which any particular rug underlay compound is tested is what is referred to as "heat age resistance." It is a general purpose of the test to determine what the physical characteristics of the compound will be after it has aged. In order to be satisfactory, the compound must withstand the aging test without becoming brittle, and preferably, the compound should remain soft and fairly resilient. The ultimate compound would be one that, after aging, still had the physical characteristics of unaged sponge. The purpose of performing a heat aging test, i.e., elevating the atmospheric temperature during the test, is merely to accelerate the aging process, which occurs primarily through oxidation of the rubber.

SUMMARY OF THE INVENTION

Accordingly, it is a primary object of the present invention to provide a flexible sponge rubber compound having improved heat aging resistance.

More specifically, it is an object of the present invention to provide an SBR rug underlay compound which is capable of withstanding a heat aging test of approximately 24 hours at about 275°F., with no significant degradation, and very little loss of resiliency.

These and other objects of the present invention, which will become apparent upon a reading of the following detailed description, are accomplished by the provision of a sponge rubber rug underlay comprising:

a. about 100 parts of a rubber, either natural or synthetic, which is subject to oxidative degradation;

b. between about 200 and about 250 parts of calcium carbonate;

c. from about 0.5 to about 3.0 parts of an antioxidant; and d. from about 1.5 to about 3.0 parts of trisodium phosphate.

In accordance with another aspect of the present invention, the sponge rubber rug underlay as described above is improved by replacing substantially all of the soft clay with calcium carbonate.

DESCRIPTION OF THE PREFERRED EMBODIMENTS

The following brief description of a typical process for producing rug underlay is included to help explain the present invention, and not for the purpose of limiting the same.

Normally, all of the ingredients of the compound are added during the first two process steps. First, most of the dry ingredients are mixed in a ribbon blender, and that mixture subsequently goes to a Banbury where it is combined with the rubber, some of the oil, and possibly several trace ingredients.

From the Banbury, the compound may then pass through a series of mills such as a drop mill, breakdown mill, holding mill, and finally a feed mill, during which time the temperature of the compound may typically drop from about 180°F. to about 135°F. The stock may then pass through the calender where the temperature may drop an additional 15° or 20°F., after which the calendered compound passes under a steam jet, then through the curing oven. The platen temperature in the oven may typically be from about 400° to about 420°F., so that the underlay, as it leaves the oven is about 350°F. The underlay subsequently passes over a series of cooling rolls, after which the underlay is rolled and packaged, and the manufacturing process is completed.

It should be clearly understood that the present invention is no way dependent upon the particular process for making the underlay. Similarly, the present invention is in no way dependent upon or limited to a specific compound formulation, and the formulation of ingredients in the following example is presented merely to enable one skilled in the art to practice the present invention.

EXAMPLE

For purposes of comparing the heat aging characteristics of the formulation of the present invention with those of the prior art, two basic formulations were tested, varying the amounts of Aminox (antioxidant), trisodium phosphate (TSP), and tetrasodium pyrophosphate (TSPP). In the basic formulations, each of the ingredients is expressed in phr (parts per hundred of rubber, by dry weight), and proportions of the first eleven ingredients are the same in each case:

|  | I | II |
|---|---|---|
| Gentro 1506[1] | 100.0 | 100.0 |
| zinc oxide | 5.0 | 5.0 |
| stearic acid | 8.0 | 8.0 |
| titanium oxide | 9.0 | 9.0 |
| Celogen[2] | 1.5 | 1.5 |
| soda | 3.0 | 3.0 |
| Altax[3] | 1.0 | 1.0 |
| Captax[4] | 2.4 | 2.4 |
| Thionex[5] | 1.4 | 1.4 |
| sulfur | 4.0 | 4.0 |
| Circosol 2xH oil[6] | 75.0 | 75.0 |
| soft clay | 100.0 | — |
| Ca Co₃ | 125.0 | 225.0 |
| Aminox[7] | variable | variable |
| trisodium phosphate | variable | variable |
| tetrasodium pyrophosphate | variable | variable |

1- A rubbery butadiene-styrene copolymer containing about 23.6 percent bound styrene, The General Tire & Rubber Company. 2- p,p'-Oxybis-(benzenesulfonyl hydrazide), Naugatuck Chem. Div. of U.S. Rubber Co. (Uniroyal). 3- Benzothiazyl disulfide, R. T. Vanderbilt Co., Inc. 4- 2-Mercaptobenzothiazole, Vanderbilt, above. 5- Tetramethylthiuram monosulfide, E. I. duPont de Nemours & Co., Inc. 6- Naphthenic type oil, Sun Oil Co. 7- Low temperature reaction product of diphenylamine and acetone, Naugatuck, above.

Each of these basic formulations was then fabricated into a number of samples, with the amounts of Aminox, TSP and TSPP varying. The samples were heat aged for 24 hours at 275°F., then inspected and given a rating number according to the following criteria:

0 = Complete failure - extremely brittle
1 = Leatherlike, non-resilient
2 = Minimum resilience
3 = Soft plus fairly resilient
4 = Similar to unaged sponge The results of the heat aging test, with the phr of the Aminox, TSP and TSPP listed for each sample, are given in the table below, in ascending order of quality:

HEAT AGE TEST RESULTS — 24 HOURS AT 275°F.

| Sample | Basic Formula | Aminox | TSP | TSPP | Rating |
|---|---|---|---|---|---|
| A | I | — | — | — | 0 |
| B | I | — | 0.5 | — | 0 |
| C | I | — | 1.0 | — | 0 |
| D | I | — | 1.5 | — | 0 |
| E | I | — | 2.0 | — | 0 |
| F | I | — | 2.5 | — | 0 |
| L | II | — | 1.5 | — | 0 |
| P | II | — | — | 2.5 | 0 |
| T | II | 1.0 | — | 2.5 | 0 |
| X | II | 1.5 | — | 2.5 | 0 |
| Z | II | — | — | — | 0 |
| G | I | 1.0 | 2.5 | — | 1 |
| M | II | — | 2.0 | — | 1 |
| Y | II | 2.0 | — | 2.5 | 1 |
| H | I | 1.5 | 2.5 | — | 2 |
| J | I | 2.0 | 2.5 | — | 2 |
| K | I | 2.0 | — | 2.5 | 2 |
| N | II | — | 2.5 | — | 3 |
| Q | II | 1.0 | 1.5 | — | 3 |
| R | II | 1.0 | 2.0 | — | 3 |
| S | II | 1.0 | 2.5 | — | 4 |

From the preceeding test results, the following trends may be observed:

1. the best four samples (those having a rating of 3 or 4) were all made from Formula II, containing from 1.5 to 2.5 phr of the TSP;
2. all of the samples having a rating of 2 or less were made from Formula I, or contained no Aminox, or contained TSPP instead of TSP.
3. none of the samples made from Formula II, which contained from about 0.5 to about 2.0 phr Aminox and from about 1.5 to about 2.5 phr of TSP had a rating of less than 3.

Therefore, it is apparent that the polymeric rug underlay material in which substantially all of the reinforcing filler is calcium carbonate rather than soft clay, and which contains from about .5 to about 1.5 phr of an antioxidant, and which contains from about 1.0 to about 3.0 phr of an alkali metal phosphate, can be subjected to heat aging and still remain soft and fairly resilient, generally retaining the properties of unaged sponge.

As used in the specification, as well as the appended claims, the term "parts" shall mean the number of parts by dry weight, of that particular ingredient, per 100 parts by dry weight, of rubber, and the term "rubber" is understood to include either natural or synthetic rubber.

In regard to the particular number of parts of TSP, it has been found by experiment that the benefits of increased TSP level off at about 3.0 phr, and because the TSP is relatively expensive compared to the fillers and some of the other materials, it is not economically advantageous to use an amount above the indicated range.

It has been hypothesized that the ferrite ions in the soft clay permit the oxidative degradation of the SBR which occurs during aging. By replacing the soft clay with calcium carbonate (or Whiting), this ion reaction can no longer occur, thus accounting partly for the improved heat age resistance. Thus, while the present invention may be used with any rug underlay compound, it is most beneficial with natural rubber or synthetic rubbers which are subject to oxidative degradation, or blends of natural rubber and such synthetics. As used herein, the term "rubber" will be understood to mean the above.

While the present invention has been described in sufficient detail for one skilled in the art to practice the same, certain alternatives and modifications will be apparent. It is intended to include all such alternatives and modifications within the present invention, insofar as they are within the scope of the appended claims.

What is claimed is:

1. A cured flexible sponge rubber rug underlay composition, which is capable of withstanding a temperature of about 275°F. for at least about 24 hours without appreciable degradation or loss of resiliency, comprising:
   a. about 100 parts by weight of a rubber which may be subject to oxidative degradation and which is selected from the group consisting of natural rubber and a rubbery copolymer consisting of butadiene and styrene;
   b. from about 150 and to 300 parts by weight of calcium carbonate;
   c. from about 0.5 to 3.0 parts by weight of an antioxidant comprising a low temperature reaction product of diphenyl amine and acetone; and
   d. from about 1.0 to 3.0 parts by weight of trisodium phosphate.

2. The composition of claim 1 wherein the rubber is a styrene-butadiene rubber.

3. The composition of claim 1 where the calcium carbonate is used in an amount of from about 200 to 250 parts by weight and the trisodium phosphate is used in an amount of from about 1.5 to 3 parts by weight.

* * * * *